(12) United States Patent  
Ono et al.

(10) Patent No.: US 8,159,516 B2  
(45) Date of Patent: Apr. 17, 2012

(54) MULTIBEAM LASER CONTROL DEVICE FOR IMAGE FORMING APPARATUS

(75) Inventors: Syunichi Ono, Shizuoka (JP); Takashi Okano, Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 353 days.

(21) Appl. No.: 12/607,671

(22) Filed: Oct. 28, 2009

(65) Prior Publication Data

US 2010/0103240 A1   Apr. 29, 2010

Related U.S. Application Data

(60) Provisional application No. 61/109,464, filed on Oct. 29, 2008.

(51) Int. Cl.  
*B41J 2/47* (2006.01)

(52) U.S. Cl. ........................................................ 347/237
(58) Field of Classification Search .................. 347/233, 347/235, 237, 250  
See application file for complete search history.

(56) References Cited

FOREIGN PATENT DOCUMENTS

JP    2000-338726 A    12/2000
JP    2005-178080 A    7/2005

*Primary Examiner* — Huan Tran  
(74) *Attorney, Agent, or Firm* — Patterson & Sheridan, LLP

(57) ABSTRACT

An image data is pre-processed in parallel by a pre-processing unit (A) and a pre-processing unit (B) arranged in parallel. The image data is transferred in synchronization with an image processing signal obtained by ORing a BD signal and an interpolation signal. Laser scanning for plural beams of a multi-laser beam is performed in synchronization with the BD signal. Color matching processing or zeronization processing for the multi-laser beam is performed in synchronization with the image processing signal.

18 Claims, 7 Drawing Sheets

FIG. 10

COMPARISON TABLE OF BEAM GENERATING DEVICES

|  | ONE-BEAM GENERATING DEVICE | TWO-BEAM GENERATING DEVICE | FOUR-BEAM GENERATING DEVICE |
|---|---|---|---|
| NUMBER OF BEAMS | 1 | 2 | 4 |
| ARRANGEMENT IN SUB-SCANNING DIRECTION | NONE | 600dpi PITCH | 1200dpi PITCH |
| SUB-SCANNING FEED SPEED | V | V | V |
| BD SIGNAL PERIOD | T(600dpi PERIOD) | 2xT(300dpi PERIOD) | 2xT(300dpi PERIOD) |
| IMAGE TRANSFER PERIOD | T(600dpi PERIOD) | T(600dpi PERIOD) | T(600dpi PERIOD) |
| NECESSARY NUMBER OF IMAGE TRANSFER LINES | 1 - LINE/T | 1 - LINE/T | 2 - LINES/T |

FIG. 11

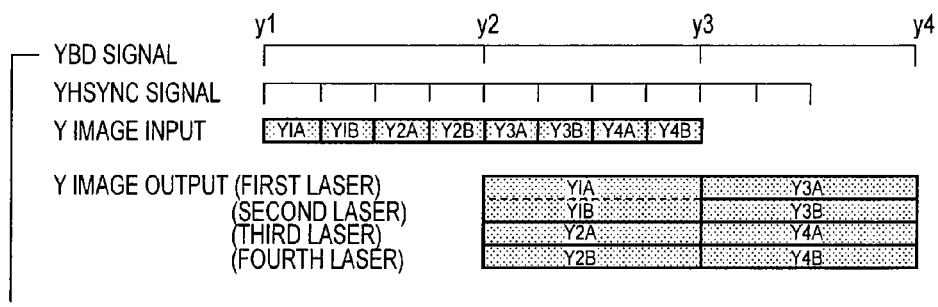

MULTIBEAM LASER CONTROL DEVICE FOR IMAGE FORMING APPARATUS

CROSS-REFERENCE TO RELATED APPLICATION

This application is based upon and claims the benefit of priority from Provisional U.S. Application 61/109,464 filed on Oct. 29, 2008, the entire contents of which are incorporated herein by reference.

TECHNICAL FIELD

The present invention relates to an image forming apparatus that performs an image forming process using a multibeam laser generating device.

BACKGROUND

As an exposing device included in an image forming apparatus, there is an inexpensive one-beam generating device that generates one laser beam in scanning performed once. An inexpensive control device that controls the one-beam generating device performs image input and image output (laser scanning) to and from the control device using a beam detect signal of the beam generating device as a synchronization signal. (The beam detect signal is a horizontal synchronization signal sent out by detecting a laser beam from the beam generating device in order to detect a reference of scanning of the laser beam emitted from the beam generating device.)

Further, as the exposing device included in the image forming apparatus, there is a device that performs image formation at high speed using a multibeam generating device that simultaneously emits plural laser beams in scanning performed once. In the exposing device of the image forming apparatus, if it is attempted to realize, using the multibeam generating device, image processing speed same as that realized by using the one-beam generating device, when resolution in a sub-scanning direction is high, a control device that processes image data at high speed is necessary. As an example, with the resolution in scanning of one beam set to 600 dpi, two beams are compared. When a pitch of a multibeam laser is 600 dpi, processing speed is the same. However, when the pitch is 1200 dpi, since lines are doubled, the processing speed needs to be doubled. When a control device having high image processing speed is used as the control device for the multibeam generating device, since the control device is expensive, it is likely that an increase in cost of the image forming apparatus is caused.

In an image forming apparatus that uses the multibeam generating device in order to obtain high image forming speed, there is a demand for development of a multibeam control device that can perform high-speed image processing in a relatively inexpensive control device and can maintain a high image quality.

SUMMARY

An aspect of the present invention is to realize, in performing control of a multibeam laser arranged at high resolution on a sub-scanning side using a multibeam generating device, without increasing image forming speed and a reduction in cost while maintaining an image quality of an image forming apparatus.

According to an embodiment of the present invention, a multibeam laser control device for an image forming apparatus includes: a control unit to preprocess image data in parallel using plural preprocessing units and output preprocessing data accumulated in a buffer to a multibeam generating unit; a signal interpolating unit to send out an interpolation signal which period is shifted from a beam detection signal sent out by detecting a beam of the multibeam generating unit; and a signal processing unit to send out an image processing signal obtained by ORing the beam detection signal and the interpolation signal.

DESCRIPTION OF THE DRAWINGS

FIG. 10 is a table for explaining, laser scanning, sub-scanning resolution, and a period of image data transfer of beam generating devices as supplementary explanation of the embodiment;

FIG. 11 is a timing chart for explaining, laser scanning timing of the laser exposing device and a part of transfer timing for image data according to supplementary explanation of the embodiment;

DETAILED DESCRIPTION

Figure 1:
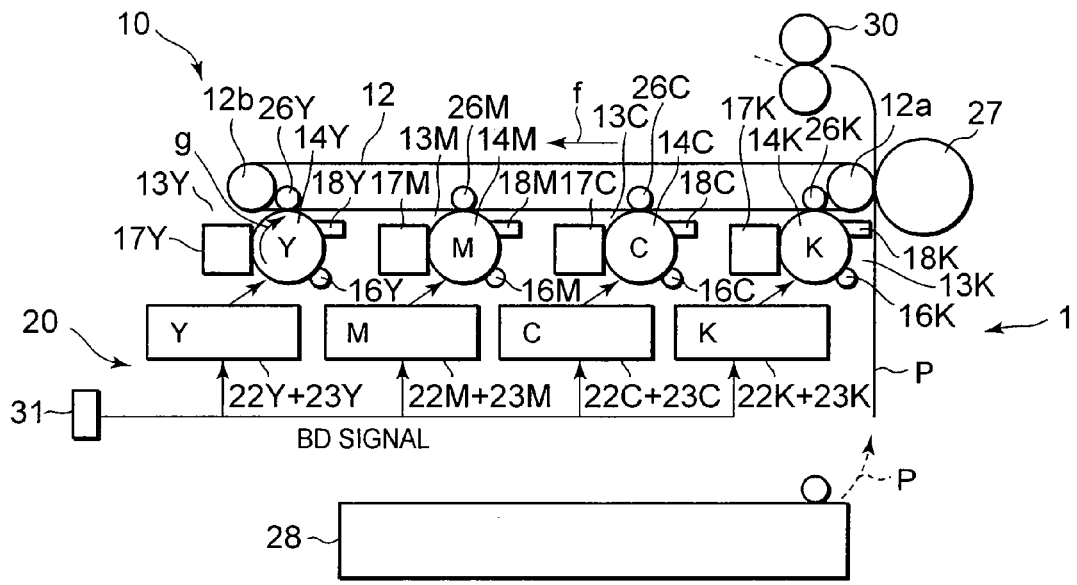
FIG. 1 is a schematic structural diagram of a color image forming apparatus according to an embodiment.

An embodiment is explained below. FIG. 1 is a schematic structural diagram of a main part of a color image forming apparatus 1 of a quadruple tandem system according to the embodiment. An image forming unit 10 of the color image forming apparatus 1 includes an intermediate transfer belt 12 that is supported by a driving roller 12a and a driven roller 12b and rotates in an arrow f direction. The image forming unit 10 includes four sets of image forming stations 13Y, 13M, 13C, and 13K for yellow (Y), magenta (M), cyan (C), and black (K) arranged in tandem along a lower side of the intermediate transfer belt 12.

The image forming stations 13Y, 13M, 13C, and 13K respectively include photoconductive drums 14Y, 14M, 14C, and 14K. A rotating direction of the photoconductive drums 14Y, 14M, 14C, and 14K indicated by an arrow g is set as a sub-scanning direction. A direction orthogonal to the sub-scanning direction is set as a main scanning direction.

Charging devices 16Y, 16M, 160, and 16K, developing devices 17Y, 17M, 17C, and 17K, and photoconductive cleaners 18Y, 18M, 18C, and 18K are respectively arranged around the photoconductive drums 14Y, 14M, 14C, and 14K along the rotating direction.

Exposure lights emitted by a laser exposing device are irradiated respectively between the charging devices 16Y, 16M, 16C, and 16K and the developing devices 17Y, 17M, 17C, and 17K around the photoconductive drums 14Y, 14M, 14C, and 14K. The photoconductive drums 14Y, 14M, 14C, and 14K are exposed by the laser exposing device 20 to form electrostatic latent images thereon.

Primary transfer rollers 26Y, 26M, 26C, and 26K are arranged in positions opposed to the photoconductive drums 14Y, 14M, 14C, and 14K via the intermediate transfer belt 12. While the intermediate transfer belt 12 is rotated in the arrow f direction, the primary transfer rollers 26Y, 26M, 26C, and 26K primarily transfer toner images formed on the photoconductive drums 14Y, 14M, 14C, and 14K onto the intermediate transfer belt 12.

A secondary transfer roller 27 is arranged in a secondary transfer position of the intermediate transfer belt 12 supported by the driving roller 12*a*. When a sheet P fed from a paper feeding unit 28 passes between the intermediate transfer belt 12 and the secondary transfer roller 27, a transfer electric field is formed between the intermediate transfer belt 12 and the secondary transfer roller 27 in the secondary transfer position. The toner images on the intermediate transfer belt 12 are secondarily transferred onto the sheet P. The toner images are fixed on the sheet P passing through the secondary transfer position by a fixing unit 30.

When the image forming unit 10 starts an image forming process, image forming steps are sequentially carried out in the image forming stations 13Y, 13M, 13C, and 13K according to image data input from a scanner unit, a personal computer terminal, and the like. Toner images are formed on the photoconductive drums 14Y, 14M, 14C, and 14K. The toner images on the photoconductive drums 14Y, 14M, 14C, and 14K are primarily transferred onto the intermediate transfer belt 12. A full-color toner image is formed on the intermediate transfer belt 12. The full-color toner image on the intermediate transfer belt is transferred onto the sheet P in the secondary transfer position and then fixed by the fixing unit 30. When the full-color toner image is fixed, the image forming unit 10 finishes the image forming process.

Figure 2:
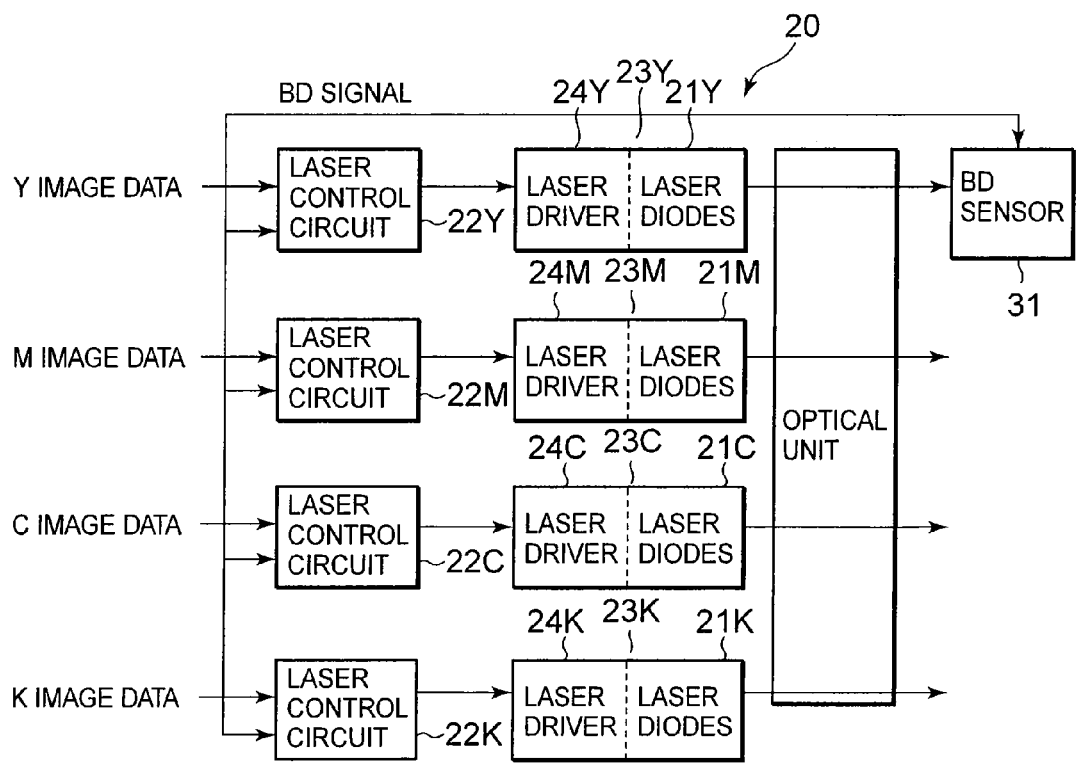
FIG. 2 is a schematic control diagram of a laser exposing device according to the embodiment.

The laser exposing device 20 is explained in detail. FIG. 2 is a schematic control diagram of the laser exposing device 20. The laser exposing device 20 includes laser control circuits 22Y, 22M, 22C, and 22K as control units and laser scan units 23Y, 23M, 23C, and 23K as multibeam generating units. The laser control circuits 22Y, 22M, 22C, and 22K respectively perform necessary image processing according to the input of Y image data, M image data, C image data, and K image data transmitted for respective color components.

The laser scan units 23Y, 23M, 23C, and 23K respectively include laser diodes 21Y, 21M, 21C, and 21K as multibeam generating units and laser drivers 24Y, 24M, 24C, and 24K. The laser diodes 21Y, 21M, 21C, and 21K respectively emit laser beams in four lines, i.e., a first beam to a fourth beam, simultaneously. The sub-scanning resolution of the laser beams of the laser diodes 21Y, 21M, 21C, and 21K is, for example, 1200 dpi.

The laser scan units 23Y, 23M, 23C, and 23K respectively scan the laser beams according to processing data output from the laser control circuits 22Y, 22M, 22C, and 22K. An optical unit 25 focuses the laser beams, which are emitted from the laser scan units 23Y, 23M, 23C, and 23K, on the photoconductive drums 14Y, 14M, 14C, and 14K, respectively. The laser scan units 23Y, 23M, 23C, and 23K and the optical unit 25 are often collectively formed as a unit.

The laser exposing device 20 includes a BD (beam detect) sensor 31 arranged on an extension in the main scanning direction of the photoconductive drum 14Y for yellow (Y). The BD sensor 31 outputs a beam detection signal shown in FIG. 4, which is a YBD signal (sensor) equivalent to sub-scanning accuracy of 300 dpi (hereinafter abbreviated as BD signal). The BD sensor 31 detects the start of scanning of a Y laser beam output from the laser diode 21Y for yellow (Y) and outputs the BD signal. The BD signal output from the BD sensor 31 is input to the laser control circuits 22Y, 22M, 22C, and 22K in parallel.

Figure 3:
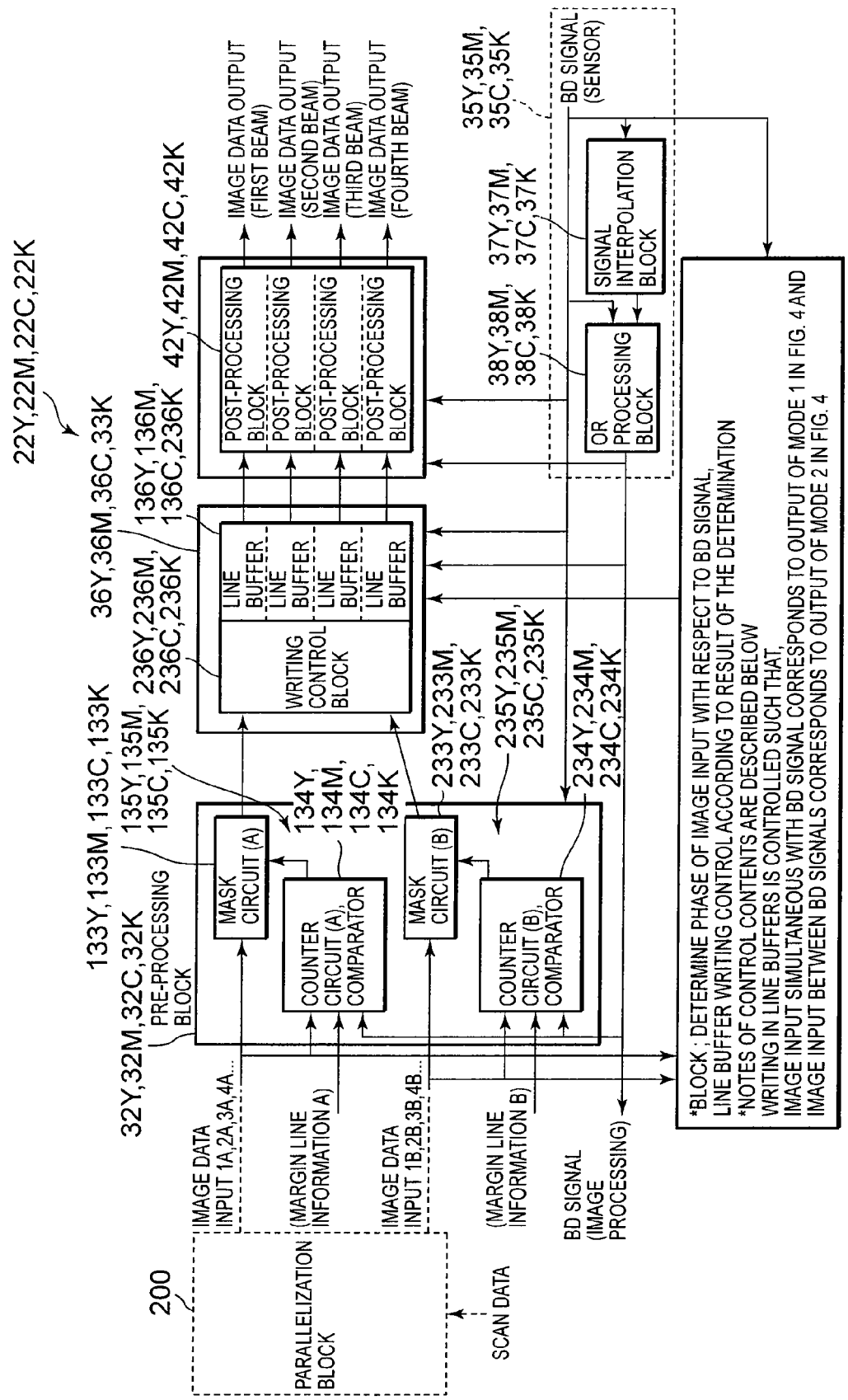
FIG. 3 is a schematic block diagram of a laser control circuit (for a single color) according to the embodiment.

FIG. 3 is a schematic block diagram of one of the laser control circuits 22Y, 22M, 22C, and 22K. The laser control circuits 22Y, 22M, 22C, and 22K have the same configuration. The same configuration is explained below by using reference numerals and signs common to the laser control circuits 22Y, 22M, 22C, and 22K.

The laser control circuits 22Y, 22M, 22C, and 22K respectively include pre-processing blocks 32Y, 32M, 32C, and 32K that respectively pre-process image data of yellow (Y), magenta (M), cyan (C), and black (K). The pre-processing blocks 32Y, 32M, 32C, and 32K respectively include pre-processing units (A) 135Y, 135M, 135C, and 135K and pre-processing units (B) 235Y, 235M, 235C, and 235K. The pre-processing units (A) 135Y, 135M, 135C, and 135K respectively include mask circuits (A) 133Y, 133M, 133C, and 133K and counter circuits (A) and comparators 134Y, 134M, 134C, and 134K. The pre-processing units (B) 235Y, 235M, 235C and 235K respectively include mask circuits (B) 233Y, 233M, 233C, and 233K and counter circuits (B) and comparators 234Y, 234M, 234C, and 234K. The pre-processing units (A) 135Y, 135M, 135C, and 135K and the pre-processing units (B) 235Y, 235M, 235C, and 235K are arranged in parallel.

Image data are input to the pre-processing units (A) 135Y, 135M, 135C, and 135K and the pre-processing units (B) 235Y, 235M, 235C, and 235K in parallel. Parallelization of the image data for the input to the pre-processing units (A) 135Y, 135M, 135C, and 135K or the pre-processing units (B) 235Y, 235M, 235C, and 235K is performed by compressing and decompressing the image data in, for example, a parallelization block 200 indicated by a dotted line in FIG. 3. When image data such as scan data is input to the parallelization block 200, the parallelization block 200 subjects the packed image data to decompression processing and inputs the image data equivalent to one line to the pre-processing units (A) 135Y, 135M, 135C, and 135K side and the pre-processing units (B) 235Y, 235M, 235C, and 235K side, respectively.

For example, image data in odd number lines is input to the mask circuits (A) 133Y, 133M, 133C, and 133K and the counter circuits (A) and comparators 134Y, 134M, 134C, and 134K. Image data in even number lines is input to the mask circuits (B) 233Y, 233M, 233C, and 233K and the counter circuits (B) and comparators 234Y, 234M, 234C, and 234K.

The pre-processing blocks 32Y, 32M, 32C, and 32K perform color matching processing (delay processing) for the image data in order to align positions of electrostatic latent images formed on the photoconductive drums 14Y, 14M, 14C, and 14K arrayed in tandem. In the color matching processing, the pre-processing blocks 32Y, 32M, 32C, and 32K adjust, with the Y image data as a reference and according to arrangement intervals of the photoconductive drums 14Y, 14M, 14C, and 14K, the output position of the M image data, the C image data, and the K image data sequentially delayed at predetermined timing. The pre-processing blocks 32Y, 32M, 32C, and 32K performs color matching in the sub-scanning direction by delaying the M image data, the C image data, and the K image data at the respective predetermined timings with respect to the Y image data.

The pre-processing blocks 32Y, 32M, 32C, and 32K perform, as one of functions, zeronization processing for image data for forming a margin area around an image. The zeronization processing is defined as a zeronization processing for forcibly converting the image data to zero and outputting the image data, when although image data is input to the pre-processing blocks 32Y, 32M, 32C, and 32K, the inputted image data is a data which outputted to the margin area. The margin area of the image is, for example, set in the color image forming apparatus 1 in advance.

The laser control circuits 22Y, 22M, 22C, and 22K respectively include post-processing blocks 42Y, 42M, 42C, and 42K that respectively post-process pre-processed data pre-processed in parallel by the pre-processing units (A) 135Y, 135M, 135C, and 135K and the pre-processing units (B) 235Y, 235M, 235C, and 235K. The post-processing blocks 42Y, 42M, 42C, and 42K perform, for example, light emission control for the laser diodes 21Y, 21M, 21C, and 21K and adjust the intensity and the like of laser beams.

The post-processing blocks 42Y, 42M, 42C, and 42K output post-processed data in four lines to the laser scan units 23Y, 23M, 23C, and 23K in parallel. The laser scan units 23Y, 23M, 23C, and 23K simultaneously emit four laser beams in scanning performed once.

The laser control circuits 22Y, 22M, 22C, and 22K respectively include buffers 36Y, 36M, 36C, and 36K that pass the pre-processed data from the pre-processing blocks 32Y, 32M, 32C, and 32K to the post-processing blocks 42Y, 42M, 42C, and 42K. The buffers 36Y, 36M, 36C, and 36K respectively include four line buffers 136Y, 136M, 136C, and 136K that respectively store image data for one line of a laser beam and writing control blocks 236Y, 236M, 236C, and 236K that control data output from and data input to the line buffers 136Y, 136M, 136C, and 136K.

The buffers 36Y, 36M, 36C, and 36K parallelize the pre-processed data, which are transferred in two line units from the mask circuits (A) 133Y, 133M, 133C, and 133K and the mask circuits (B) 233Y, 233M, 233C, and 233K, into four lines in a two-transfer unit period and pass the pre-processed data to the post-processing blocks 42Y, 42M, 42C, and 42K.

The buffers 36Y, 36M, 36C, and 36K are subjected to pipeline processing together with the pre-processing blocks 32Y, 32M, 32C, and 32K and the post-processing blocks 42Y, 42M, 42C, and 42K. The buffers 36Y, 36M, 36C, and 36K pass data, which are transferred from the mask circuits (A) 133Y, 133M, 133C, and 133K and the mask circuits (B) 233Y, 233M, 233C, and 233K in order, to the post-processing blocks 42Y, 42M, 42C, and 42K in order according to the pipeline processing.

The signal generating units 35Y, 35M, 35C, and 35K respectively include signal interpolation blocks 37Y, 37M, 37C, and 37K as signal interpolating units for adding, to a 300 dpi BD signal output from the BD sensor 31, an interpolation signal obtained by shifting a period of the BD signal by a half period. The signal generating units 35Y, 35M, 35C, and 35K respectively include OR processing blocks 38Y, 38M, 38C, and 38K as signal processing units that CR the BD signal and the interpolation signal. The OR processing blocks 38Y, 38M, 38C, and 38K output an image processing signal shown in FIG. 4, which is a BD signal (image processing) equivalent to accuracy of 600 dpi (hereinafter abbreviated as data transfer signal).

(I) Laser scanning by the laser exposing device and a principle of transfer timing for image data are explained with reference to a one-beam generating device having a resolution of 600 dpi.

For example, in the color image forming apparatus 1 according to this embodiment shown in FIG. 1, a one-beam generating device is used as an exposing device to form an image. In the color image forming apparatus 1, the photoconductive drums 14Y, 14M, 14C, and 14K are physically arranged in parallel. Therefore, in order to obtain a color image, color matching processing for toner images of Y, M, C, and K is necessary.

Figure 5:
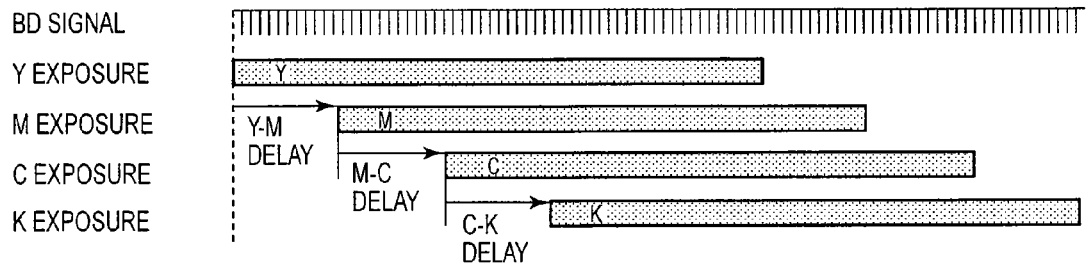
FIG. 5 is a diagram for explaining, a principle of color matching for a color image performed by using a one-beam generating device as supplementary explanation of the embodiment.

For the color matching processing for the toner images, as shown in FIG. 5, the exposing device Y-M-delays M exposure light with respect to Y exposure light, M-C-delays C exposure light with respect to the M exposure light, and C-K-delays K exposure light with respect to the C exposure light to expose the photoconductive drums 14Y, 14M, 14C, and 14K. Electrostatic latent images on the photoconductive drums 14Y, 14M, 14C, and 14K formed by sequentially delaying the exposures are visualized and primarily transferred onto the intermediate transfer belt 12, whereby a color image subjected to color matching processing in the sub-scanning direction is formed on the intermediate transfer belt 12.

Figure 6:
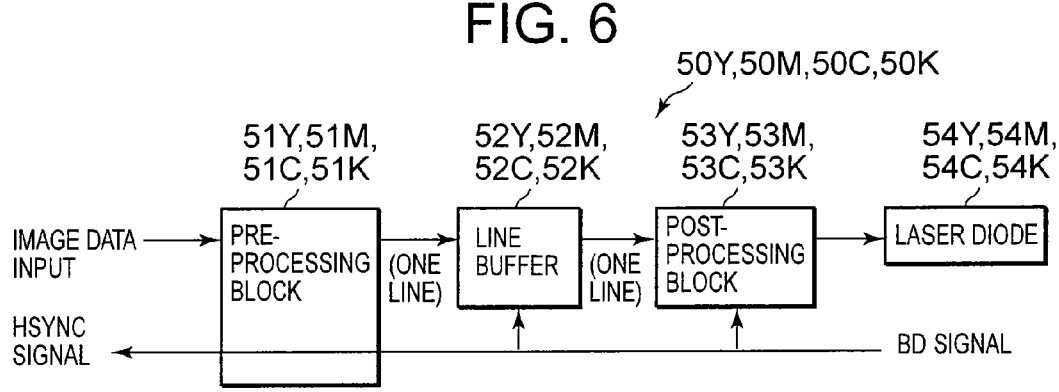
FIG. 6 is a schematic block diagram for explaining, a control device for the one-beam generating device as supplementary explanation of the embodiment.

The delay of the exposure lights of Y, M, C, and K for color-matching the color image in the sub-scanning direction is performed by counting a BD signal of the beam generating device, which is also a horizontal synchronization signal (HSYNC signal). The HSYNC signal indicates a reference for transferring image data. As shown in FIG. 6, laser control devices 50Y, 50M, 50C, and 50K for Y, M, C, and K of the one-beam generating device respectively include pre-processing blocks 51Y, 51M, 51C, and 51K that respectively pre-process image data of Y, M, C, and K, line buffers 52Y, 52M, 52C, and 52K that buffer pre-processed data by one line, and post-processing blocks 53Y, 53M, 53C, and 53K that post-process the pre-processed data and output the post-processed data to the laser diodes 54Y, 54M, 54C, and 54K.

The laser control devices 50Y, 50M, 50C, and 50K transfers and processes all of the image data in one-line units throughout the input to output of the image data with the BD signal. The BD signal is transmitted to a scanner unit, a system control unit, an image processing unit, and the like as a horizontal synchronization signal (HSYNC signal).

First, timing for performing image data transfer (image input) and performing laser scanning (image output) using the one-beam generating device is explained. The timing for the image input and the timing for the image output are the same for images of yellow (Y), magenta (M), cyan (C), and black (K). Therefore, the timing is explained with the laser control device 50Y for yellow (Y) as an example.

Figure 7:
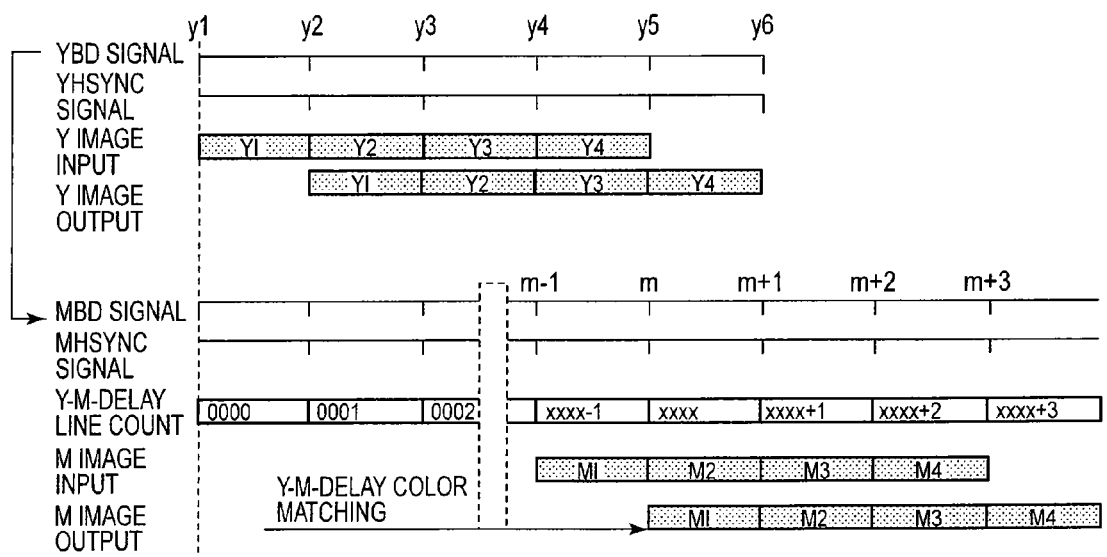
FIG. 7 is a timing chart for explaining, color matching processing by the one-beam generating device as supplementary explanation of the embodiment.

As shown in FIG. 7, the laser control device 50Y for yellow (Y) performs Y image input using a YBD signal. The laser control device 50Y performs Y image output according to a YHSYNC signal.

In the one-beam generating device, a period of the YHSYNC signal is the same as a period of a YBD signal of a 600 dpi laser beam. Actually, the laser control device 50Y for yellow (Y) performs Y1 image input at the timing of y1, performs Y1 image output and Y2 image input at the timing of y2, and performs Y2 image output and Y3 image input at the timing of y3. Thereafter, similarly, the laser control device 50Y sequentially performs image input image data with the YBD signal and image output the inputted image data with the next YHSYNC signal. Timing for the image input and timing for the image output are the same in the laser control devices 50M, 50C, and 50K for M, C, and K.

As shown in FIG. 5, timing for image data transfer (image input) and laser scanning (image output) for sequentially delaying M, C, and K exposures with respect to the Y exposure light and performing color matching processing in the sub-scanning direction is explained. The timing for the image data transfer and the timing for the laser scanning for performing the color matching processing is the same for images of magenta (M), cyan (C), and black (K). Therefore, the timing is explained with the laser control device 50M for magenta (M) as an example.

As shown in FIG. 7, the laser control device 50M for magenta (M) counts an MBD signal with image input of yellow (Y) as a reference and starts M image input (image data transfer) for magenta (M) from a Y-M-delayed (xxxx-1) line. The laser control device 50M performs the M image input according to the MBD signal and performs M image output (laser scanning) according to an MHSYNC signal. Timing for the MHSYNC signal and timing for the MBD signal are the same.

Actually, the laser control device 50M for magenta (M) performs M1 image input from the (xxxx-1) line at the timing of m−1, performs M1 image output and M2 image input at the timing of m, and performs M2 image output and M3 image input at the timing of m+1 according to the MBD signal. Thereafter, similarly, the laser control device 50M sequentially inputs image data with the MBD signal and outputs the inputted image data with the next MHSYNC signal.

A principle of zeronization processing for forming a margin area on an image is explained. Timing for image data transfer and timing for laser scanning for performing the zeronization processing are the same for images of yellow (Y), magenta (M), cyan (C), and black (K). Therefore, the timing is explained with the laser control device 50Y for yellow (Y) as an example.

Figure 8:
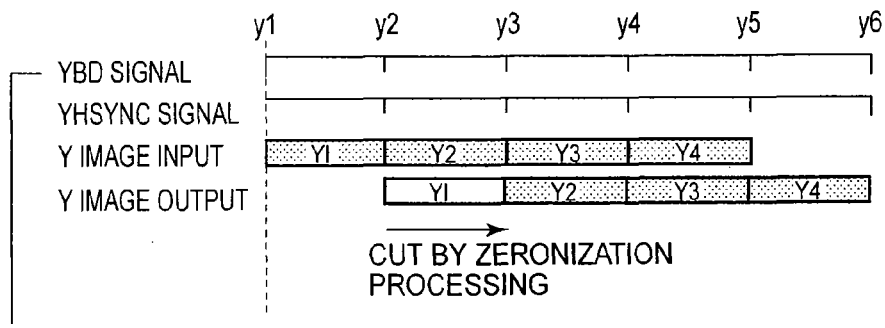
FIG. 8 is a timing chart for explaining, zeronization processing by the one-beam generating device as supplementary explanation of the embodiment.

As shown in FIG. 8, when transfer of image data is started, the laser control device 50Y for yellow (Y) sequentially performs Y1 image input at the timing of y1 and performs Y1 image output and Y2 image input at the timing of y2. Thereafter, the laser control device 50Y sequentially performs image input image data with the YBD signal and image output the inputted image data with the next YHSYNC signal. However, when an area for performs image output the image data Y1 at the timing of y2 is set as a margin area in advance, the image data Y1 is converted into zero data and performs image output at the timing of y2. Therefore, actually, image formation is started from the image data Y2 output at the timing of y3.

In the case of the one-beam generating device, periods of the YHSYNC signal and the YBD signal are the same period 600 dpi. Therefore, for example, in the case of magenta (M), accuracy of color matching processing in the sub-scanning direction performed by counting the number of lines with the MHSYNC signal is 600 dpi. Further, in the case of yellow (Y), accuracy of zeronization processing performed by counting the YHSYNC signal is 600 dpi.

(II) Resolutions of laser scanning and sub-scanning of the one-beam generating device and the multibeam generating device are explained.

The laser scanning is main scanning. For example, when a photoconductive drum rotates in the sub-scanning direction perpendicular to the main scanning direction, a scanning image is formed on the photoconductive drum. As the resolution of a laser beam of the one-beam generating device, in general, 600 dpi is known. The multibeam generating devices are, for example, a two-beam generating device, the resolution of a laser beam of which is 600 dpi, and a four-beam generating device, the resolution of a laser beam of which is 1200 dpi.

Figure 9:
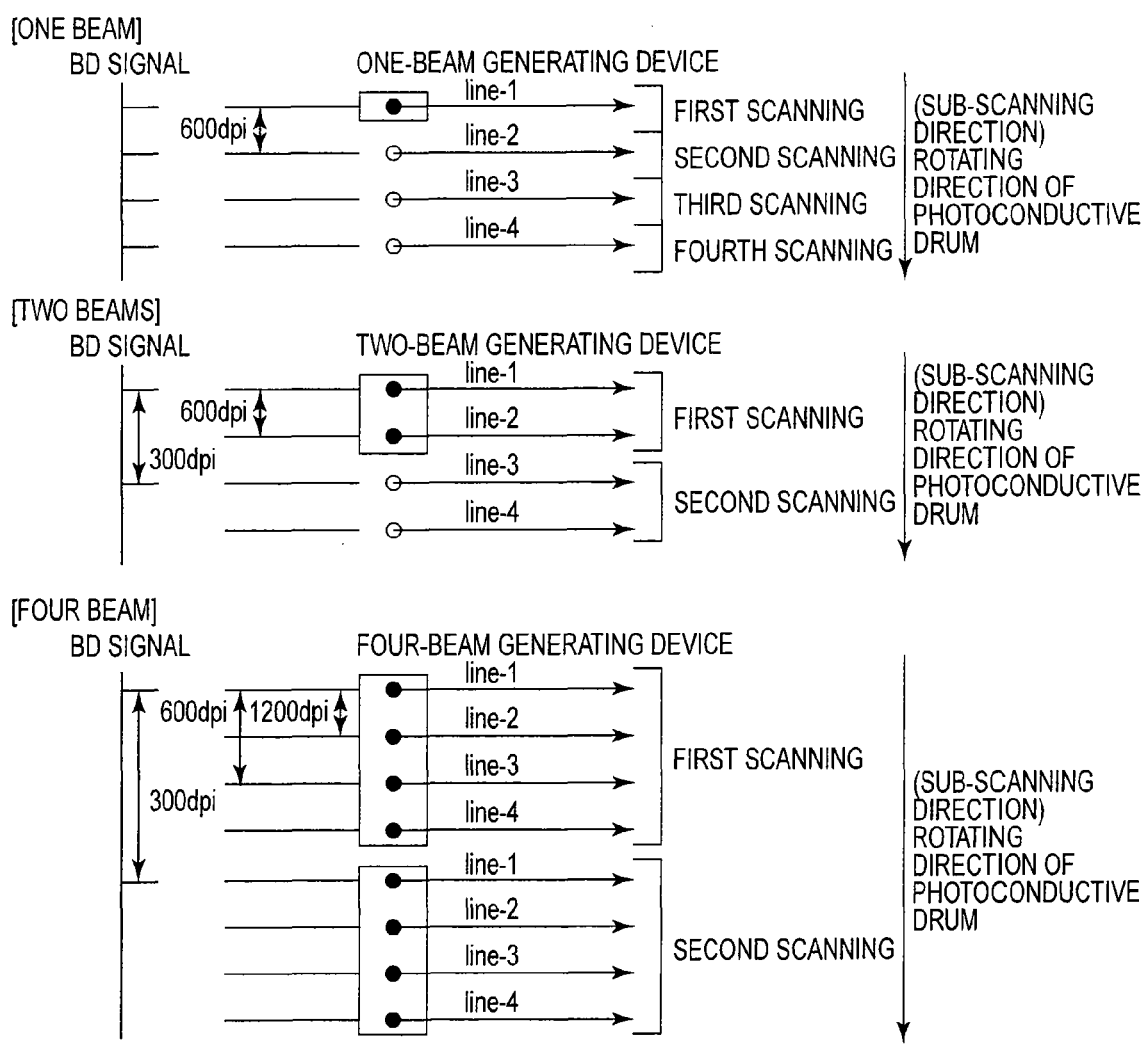
FIG. 9 is a diagram for explaining, the resolutions of laser scanning and sub-scanning of the one-beam generating device and a multibeam generating device as supplementary explanation of the embodiment.

As shown in FIG. 9, in the one-beam generating device, both resolution for main scanning and resolution for sub-scanning are 600 dpi. A period (scanning resolution) of a BD signal generated by detecting a laser beam is also 600 dpi.

On the other hand, the two-beam generating device that emits a multibeam having a resolution of 600 dpi scans two laser beams with a BD signal generated once. A period of the BD signal of the two-beam generating device is 300 dpi, which is a half of that of the one-beam generating device. The two-beam generating device only has to perform laser scanning at a period twice as long as that of the one-beam generating device.

The four-beam generating device that emits a multibeam having a resolution of 1200 dpi scans four laser beams in parallel in scanning performed once. A period of a BD signal of the four-beam generating device that scans four laser beams with a BD signal generated once is 300 dpi. The four-beam generating device can perform laser scanning at a period twice as long as that of the one-beam generating device, same as that performed by the two-beam generating device. The four-beam generating device can be regarded as a device in which one line of the two-beam generating device is divided into two lines.

The 600 dpi one-beam generating device, the 600 dpi two-beam generating device, and the 1200 dpi four-beam generating device are compared. It is assumed that imaging speed (laser scanning speed) is the same and all rotating speeds of photoconductive drums are the same rotating speed V. As shown in FIG. 9, in the four-beam generating device, image data twice as large as that in the one-beam generating device and the two-beam generating device is transferred, since laser beams are arranged at the pitch of 1200 dpi in the sub-scanning direction.

Comparison of the one-beam generating device, the two-beam generating device, and the four-beam generating device is shown in FIG. 10, when sub-scanning feed speeds of all of which are set to V. As the arrangement of laser beams in the sub-scanning direction, the laser beams are arranged at the 600 dpi pitch in the two-beam generating device and are arranged at the 1200 dpi pitch in the four-beam generating device. A period of a BD signal is T (600 dpi period) in the one-beam generating device and 2×T (300 dpi period) in the two-beam generating device and the four-beam generating device. An image transfer period is T (600 dpi period) in all the beam generating devices. When the number of image transfer lines is represented as 1-line/T in the one-beam generating device and the two-beam generating device, 2-lines/T is necessary in the four-beam generating device.

(III) Control of the four-beam generating device having a resolution of 1200 dpi is explained.

(1) On the condition that the number of image transfer lines is represented as 1-line/T, high-speed processing of an image is necessary in the four-beam generating device, in order to realize imaging speed (laser scanning speed) same as that of the one-beam generating device or the two-beam generating device. For example, as shown in FIG. 11, a control device that processes image data for four lines Y1A, Y1B, Y2A, and Y2B at highspeed while performing laser scanning with the YBD signal is necessary. However, it is likely that a high-speed control device that processes image data for four lines while performing scanning with a 1200 dpi laser is expensive and increases power consumption.

(2) In case where to perform color matching processing in the sub-scanning direction by counting a BD signal as a horizontal synchronization signal as in the one-beam generating device, in the four-beam generating device, the color matching processing is performed at accuracy of a unit of 300 dpi. Therefore, it is likely that color matching accuracy decrease to inferior in image quality.

Further, in the four-beam generating device, when it is attempted to perform zeronization processing for forming a margin area in synchronization with the DB signal as in the one-beam generating device, the zeronization processing is performed at accuracy of a unit of 300 dpi. Therefore, the processing is roughened. When the zeronization processing is performed in a unit of 300 dpi, it is likely that, since a boundary of the margin area is unclear, an image quality is deteriorated.

In the four-beam generating device, when the color matching processing or the zeronization processing in the sub-scanning direction is performed with HSYNC of image data transfer, highly accurate control is possible at 1200 dpi in terms of sub-scanning resolution. However, compatibility of image data transfer and the like with the one-beam generating device or the two-beam generating device having accuracy of 600 dpi in terms of sub-scanning resolution is lacked.

(IV) On the other hand, in the four-beam generating device, in order to realize imaging speed same as that of the one-beam generating device or the two-beam generating device, according to a table of FIG. 10, the four-beam generating device needs to transmit image data having the number of lines twice as large as that of the one-beam generating device or the two-beam generating device. In the four-beam generating device, it is necessary to transfer image data and perform image processing at twice speed in order to maintain the imaging speed. In the four-beam generating device, laser scanning can be performed at a period twice as long as that of the one-beam generating device as in the two-beam generating device. According to the table of FIG. 10, a period of the BD signal of the four-beam generating device only has to be 300 dpi in terms of sub-scanning resolution.

Therefore, in this embodiment, the laser diodes 21Y, 21M, 21C, and 21K that simultaneously emit laser beams in four lines are controlled by using the laser control circuits 22Y, 22M, 22C, and 22K shown in FIG. 3. Specifically, a data transfer signal obtained by adding, to the 300 dpi BD signal output from the BD sensor 31, an interpolation signal obtained by shifting a period of the BD signal by a half period is set as a horizontal synchronization signal, which is a reference for image data transfer (image input).

Figure 4:
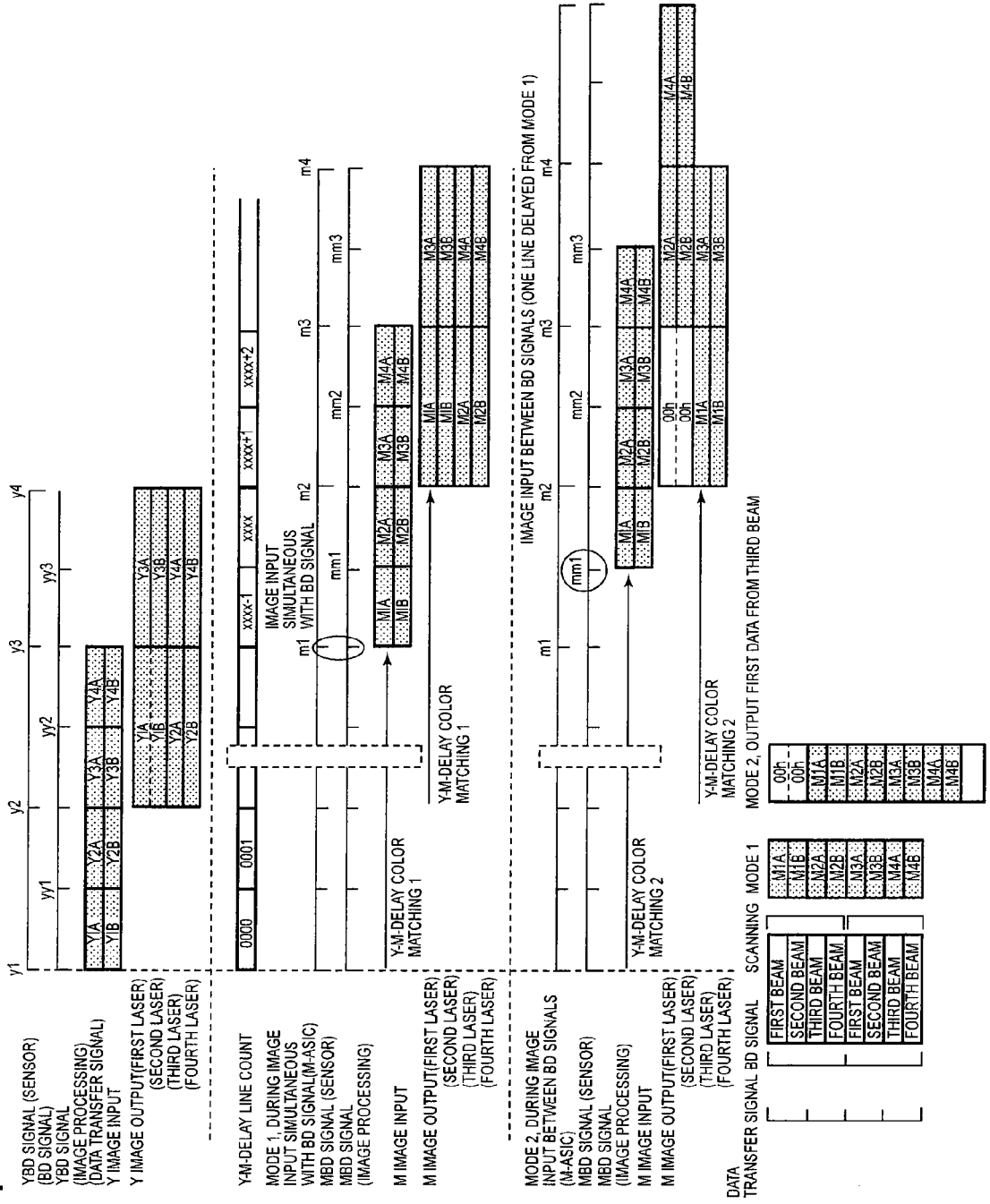
FIG. 4 is a timing chart of laser scanning timing of the laser exposing device and a part of transfer timing for image data according to the embodiment.

A control process by the laser control circuits 22Y, 22M, 22C, and 22K for the laser diodes 21Y, 21M, 21C, and 21K that simultaneously emit laser beams in four lines is explained. The laser control circuits 22Y, 22M, 22C, and 22K perform, laser scanning (image output) for the laser diodes 21Y, 21M, 21C, and 21K using the BD signal. The laser control circuits 22Y, 22M, 22C, and 22K perform image data transfer (image input) using an image data transfer signal. As shown in FIG. 4, the BD signal send out timing signals of y1, y2, y3, y4, and the like equivalent to 300 dpi. The data transfer signal send out timing signals y1, yy1, y2, yy2, y3, yy3, y4, yy4, and the like equivalent to 600 dpi.

The image forming unit 10 starts driving according to the start of the image forming process. On the other hand, image data is input to the laser control circuits 22Y, 22M, 22C, and 22K. Referring to the laser control circuit 22Y for yellow (Y) as an example, as shown in FIG. 4, at the timing of y1, yy1, y2, yy2, y3, and the like of the data transfer signal, image data Y1A, Y2A, Y3A, Y4A, and the like in odd number lines are sequentially input to the pre-processing unit (A) 135Y as images. In parallel to the image input to the pre-processing unit (A) 135Y, image data Y1B, Y2B, Y3B, Y4B, and the like in even number lines are sequentially input to the pre-processing unit (B) 235Y as images.

The image data input to the pre-processing units (A) 135Y, 135M, 135C, and 135K and the pre-processing units (B) 235Y, 235M, 235C, and 235K are subjected to delay processing or zeronization processing for color matching as pre-processing. Pre-processed image data subjected to the pre-processing are transferred to the buffers 36Y, 36M, 36C, and 36K from the pre-processing units (A) 135Y, 135M, 135C, and 135K and the pre-processing units (B) 235Y, 235M, 235C, and 235K, respectively.

The delay processing for sequentially delaying, for color matching in the sub-scanning direction, M exposure, C exposure, and K exposure with respect to Y exposure by predetermined timing according to the arrangement of the photoconductive drums 14Y, 14M, 14C, and 14K is performed by delay-line counting image data transfer signals as horizontal synchronization signals according to data transfer signals in the counter circuits (A) and comparators 134Y, 134M, 134C, and 134K and the counter circuits (B) and comparators 234Y, 234M, 234C, and 234K, respectively.

The zeronization processing for outputting, as zero data, image data corresponding to a margin area set in advance is performed by comparing lines set as the margin area and lines of the image data in the counter circuits (A) and comparators 134Y, 134M, 134C, and 134K and the counter circuits (B) and comparators 234Y, 234M, 234C, and 234K.

In case where zeronization is not performed, as shown in FIG. 4, the laser control circuit 22Y for yellow (Y) sequentially transfers, pre-processed data in the buffer 36Y to the laser diode 21Y in parallel for four beams at the time of y2, y3, y4, and the like according to the BD signal, and performs laser scanning (image output). At the timing of y2, the laser control circuit 22Y transfers pre-processed image data Y1A, Y1B, Y2A, and Y2B in the buffer 36Y to the post-processing block 42Y and outputs post-processed image data to the laser diode 21Y in parallel for four beams. At the timing of, y3, the laser control circuit 22Y transfers pre-processed image data Y3A, Y3B, Y4A, and Y4B in the buffer 36Y to the post-processing block 42Y and outputs post-processed image data to the laser diode 21Y in parallel for four beams.

The laser control circuits 22Y, 22M, 22C, and 22K controls the laser diodes 21Y, 21M, 21C, and 21K that emit laser beams having a resolution of 1200 dpi simultaneously for four lines respectively by a control circuit having compatibility with the one-beam generating device or the two-beam generating device without using the expensive high-speed control circuit.

[Color Matching Processing (Delay Processing) in the Sub-Scanning Direction]

The delay processing for the color matching processing in the sub-scanning direction is explained with the laser control circuit 22M for magenta (M) as an example. The laser control circuit 22M for magenta (M) delays M image data with respect to Y image data for color matching for toner images. As the delay of the M image data, the laser control circuit 22M Y-M-delays the M image data with respect to the Y image data using a data transfer signal according to the arrangement of the photoconductive drums 14Y and 14M for yellow (Y) and magenta (M). As shown in FIG. 4, after the image data Y1A is input to the pre-processing unit (A) 135Y and the image data Y1B is input to the pre-processing unit (B) 235Y, at the timing of y1, in the laser control circuit 22M, the counter circuit (A) and comparator 134M and the counter circuit (B) and comparator 234M perform Y-M-delay line counting according to a data transfer signal, as a pre-processing.

When the number of counts reaches the number of (xxxx-1) lines Y-M-delayed from y1, the laser control circuit 22M inputs image data. A mode 1 in FIG. 4 indicates that image data is input at the timing of m1. A mode 2 in FIG. 4 indicates that image data is input not at the timing of m1 but at the timing of mm1 even if the count of Y-M-delay lines reaches the number of (xxxx-1) lines.

[Mode 1]

In the [mode 1] in FIG. 4, the laser control circuit 22M performs, the input of image data M1A to the pre-processing unit (A) 135M and the input of image data M1B to the pre-processing unit (B) 235M in parallel at the timing of m1, using a data transfer signal. At the timing of mm1, the laser control circuit 22M performs the input of image data M2A to the pre-processing unit (A) 135M and the input of image data M2B to the pre-processing unit (B) 235M in parallel. In the laser control circuit 22M, pre-processed image data processed Y-M-delay is transferred to the buffer 36M from the pre-processing unit (A) 135M and the pre-processing unit (B) 235M, respectively.

At the timing of m2, the laser control circuit 22M transfers the pre-processed data M1A, M1B, M2A, and M2B in the buffer 36M to the post-processing block 42M. At the timing of m3, the laser control circuit 22M transfers the pre-processed data M3A, M3B, M4A, and M4B in the buffer 36M to the post-processing block 42M. The post-processing block 42M outputs the post-processed image data to the laser diode 21M at a delay of a Y-M4 line.

[Mode 2]

The [mode 2] in FIG. 4 is explained. The [mode 2] is different from the [mode 1] in a phase of image input. In the [mode 2], even when the count of the Y-M-delay lines reaches the number of (xxxx-1) lines, image data is not input to the pre-processing unit (A) 135M and the pre-processing unit (B) 235M at the timing of m1. After the count of Y-M-delay lines reaches the number of (xxxx-1) lines, and at the timing of mm1 of the data transfer signal, the image data M1A is input to the pre-processing unit (A) 135M and the image data M1B is input to the pre-processing unit (B) 235M. At the timing of m2, the image data M2A is input to the pre-processing unit (A) 135M and the image data M2B is input to the pre-processing unit (B) 235M. At the timing of mm2, the image data M3A is input to the pre-processing unit (A) 135M and the image data M3B is input to the pre-processing unit (B) 235M. The image data are transferred to the buffer 36M.

In laser scanning (image output), at the timing of m2, the pre-processed image data in the buffer 36M is transferred to the post-processing block 42M and Y-M-delayed image data is output to the laser diode 21M. However, in the case of the [mode 2], the image data in the buffer 36M is the two lines M1A and M1B at the timing of m2. Therefore, 00h (no data) is output to a first beam and a second beam of the laser diode 21M. The image data M1A is output to a third beam of the laser diode 21M. The image data M1B is output to a fourth beam of the laser diode 21M. At the timing of m3, the image data M2A, M2B, M3A, and M3B in the buffer 36M are output to the first to fourth beams of the laser diode 21M.

Delay processing for color matching in the sub-scanning direction of the laser diodes 21Y, 21M, 21C, and 21K, which emit a 1200 dpi laser beam simultaneously for four lines can be performed at accuracy of 600 dpi. In both the [mode 1] and the [mode 2], delay processing for C exposure with respect to M exposure and delay processing for K exposure with respect to C exposure are performed in the same manner as the delay processing for M exposure with respect to Y exposure.

[Zeronization Processing]

Zeronization processing to form a margin area around an image is explained with the laser control circuit 22Y for yellow (Y) as an example. Zeronization processing of the laser diodes 21Y, 21M, 21C, and 21K that output a 1200 dpi laser beam simultaneously for four lines is performed by independently comparing, with the counter circuits (A) and comparators 134Y, 134M, 134C, and 134K and the counter circuits (B) and comparators 234Y, 234M, 234C, and 234K arranged in parallel, whether input image data is data output to a margin area.

Figure 12:
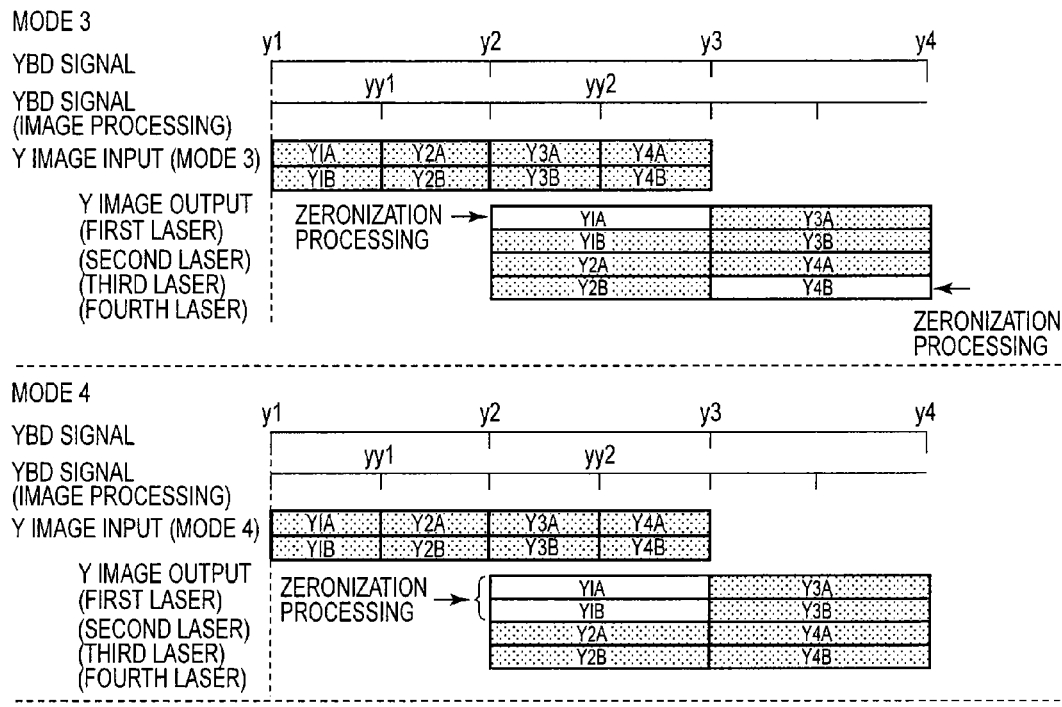
FIG. 12 is a timing chart of zeronization processing according to the embodiment.

When an image forming process is started, as shown in FIG. 12, image data is sequentially input to the pre-processing unit (A) 135Y and the pre-processing unit (B) 235Y in parallel by using a data transfer signal. At the timing of y1, the image data Y1A is input to the pre-processing unit (A) 135Y and, in parallel, the image data Y1B is input to the pre-processing unit (B) 235Y. At the timing of yy1, the image data Y2A is input to the pre-processing unit (A) 135Y and, in parallel, the image data Y2B is input to the pre-processing unit (B) 235Y.

Margin line information (A) or margin line information (B) set in advance in the color image forming apparatus 1 is input to the counter circuit (A) and comparator 134Y of the pre-processing unit (A) 135Y and the counter circuit (B) and comparator 234Y of the pre-processing unit (B) respectively. The counter circuit (A) and comparator 134Y of the pre-processing unit (A) 135Y and the counter circuit (B) and comparator 234Y of the pre-processing unit (B) 235Y compare the image data and the margin line information.

Figure 13:
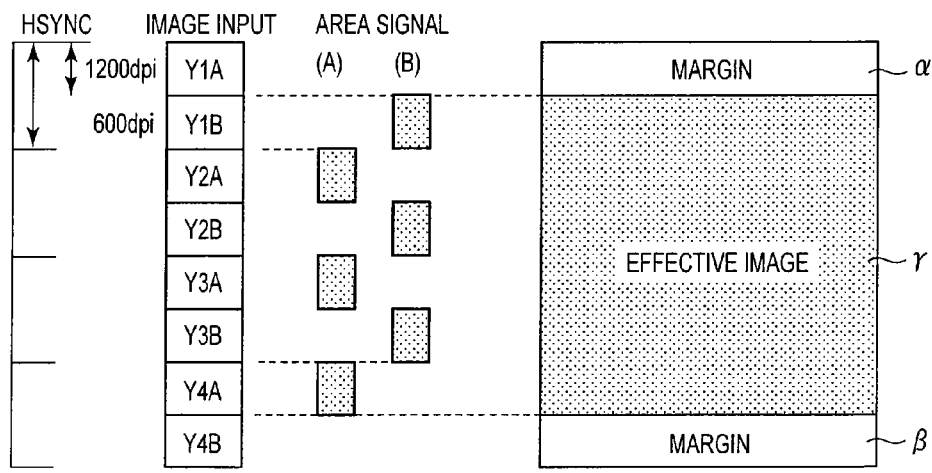
FIG. 13 is a diagram for explaining an image subjected to the zeronization processing according to the embodiment.

For example, in the case of the [mode 3], as shown in FIG. 13, it is assumed that, the image data Y1A is data output to a margin area and the image data Y2A, Y3A, and Y4A are data output to an effective area according to the margin line information (A). It is assumed that, the image data Y1B, Y2B, and Y3B are data output to the effective area and the image data Y4B is data output to the margin area according to the margin line information (B). The pre-processing unit (A) 135Y and the pre-processing unit (B) 235Y compare the image data and the margin line information and process the image data output to the margin area to the zeronization processing respectively.

Actually, the image data Y1A is the data output to the margin area according to the margin line information (A). Therefore, the pre-processing unit (A) 135Y zeronizes the image data Y1A and transfers the image data Y1A to the buffer 36Y. At the timing of y2, the pre-processing unit (A) 135Y transfers the image data in the buffer 36Y to the post-processing block 42Y, outputs the image data to the laser diode 21Y in parallel for four beams, and performs laser scanning (image output). As shown in FIG. 12, the image data output to the laser diode 21Y is the zeronized image data Y1A and the effective image data Y1B, Y2A, and Y2B.

According to the margin line information (B), the image data Y4B is the data output to the margin area in the pre-processing unit (B) 235Y that performs parallel processing with the pre-processing unit (A) 135Y. Therefore, the pre-processing unit (B) 235Y zeronizes the image data Y4B and transfers the image data Y4B to the buffer 36Y. At the timing of y3, the pre-processing unit (B) 235Y transfers the image data in the buffer 36Y to the post-processing block 42Y, outputs the image data to the laser diode 21Y in parallel for four beams, and performs laser scanning (image output). As shown in FIG. 12, the image data output to the laser diode 21Y is the effective image data Y3A, Y3B, and Y4A and the zeronized image data Y4B.

The laser scanning (the image output) is performed according to image data of an OR of outputs of the pre-processing unit (A) 135Y and the pre-processing unit (B) 235Y. As shown in FIG. 13, in an image actually formed, an area α and an area β above and below the image are margins. An effective image is formed in an area γ. The area α is zeronized by laser scanning by an area signal (A) output from the pre-processing unit (A) 135Y. The area β is zeronized by laser scanning by an area signal (B) output from the pre-processing unit (B) 235Y. The pre-processing unit (A) 135Y and the pre-processing unit (B) 235Y perform the zeronization processing for the area α and the area β in parallel. This makes it possible to perform the zeronization processing at accuracy of 1200 dpi as shown in FIG. 13.

A margin area to be zeronized is not limited and is arbitrary according to a characteristic of the color image forming apparatus 1. For example, in the case of the [mode 4], it is assumed that, the image data Y1A is data output to the margin area according to the margin line information (A), the image data Y1B is data output to the margin area according to the margin line information (B), and all the other image data are image data in the effective area. In this case, the image data Y1A and Y1B are zeronized. An area to which the image data Y1A and Y1B are output is the margin area. An effective image is formed by the image data Y2A and subsequent image data.

In this embodiment, the pre-processing units (A) 135Y, 135M, 135C, and 135K and the pre-processing units (B) 235Y, 235M, 235C, and 235K are arranged in parallel. In the OR processing blocks 38Y, 38M, 38C, and 38K, image data transfer (image input) is performed by using a data transfer signal obtained by ORing the BD signal and the interpolation signals from the signal interpolation blocks 37Y, 37M, 37C, and 37K. Laser scanning (image output) for the laser diodes 21Y, 21M, 21C, and 21K is performed by using the BD signal. As a result, the laser control circuits 22Y, 22M, 22C, and 22K having compatibility with the one-beam generating device or the two-beam generating device controls the laser diodes 21Y, 21M, 21C, and 21K for four lines are respectively controlled at imaging speed same as that of the one-beam generating device or the two-beam generating device respectively. Therefore, it is possible to prevent an increase in cost of the laser control circuits 22Y, 22M, 22C, and 22K of the laser diodes 21Y, 21M, 21C, and 21K for four lines and realize a reduction in power consumption.

In this embodiment, the delay processing for color matching in the sub-scanning direction is performed by using a data transfer signal. As a result, in the case of the laser diodes 21Y, 21M, 21C, and 21K that simultaneously emit laser beams in four lines, the delay processing for color matching in the sub-scanning direction can be performed at accuracy of 600 dpi, as same as in the case of color matching in the sub-scanning direction of the one-beam generating device, and a high-quality image with color drift prevented at high accuracy can be obtained.

Image data in the buffers 36Y, 36M, 36C, and 36K are sequentially output to the laser diodes 21Y, 21M, 21C, and 21K by using a BD signal according to the pipeline processing. Therefore, according to color matching in the sub-scanning direction, positioning control at accuracy of 600 dpi can be realized in both the [mode 1] and the [mode 2] in view of a phase relation between a BD signal to perform laser scanning and image data input to the buffers 36Y, 36M, 36C, and 36K.

In this embodiment, the zeronization processing for the margin area can be performed in synchronization with a data transfer signal. As a result, as in the one-beam generating device, the zeronization processing for the laser diodes 21Y, 21M, 21C, and 21K that simultaneously emit laser beams in four lines can be performed at accuracy of 600 dpi and a high-quality image without blurring in a boundary with the margin area can be obtained. Further, since the pre-processing units (A) 135Y, 135M, 135C, and 135K and the pre-processing units (B) 235Y, 235M, 235C, and 235K that process image data in parallel perform the zeronization processing, the margin area can be secured at processing accuracy of 1200 dpi.

The present invention is not limited to the embodiment and can be variously changed without departing from the scope of the invention. For example, the present invention may be an eight-beam laser array or the like arranged at a pitch of 1200 dpi in the sub-scanning direction.

What is claimed is:

1. A multibeam laser control device for an image forming apparatus comprising:
    a control unit to preprocess image data in parallel using plural preprocessing units and output preprocessing data accumulated in a buffer to a multibeam generating unit;
    a signal interpolating unit to send out an interpolation signal which period is shifted from a beam detection signal sent out by detecting a beam of the multibeam generating unit; and
    a signal processing unit to send out an image processing signal obtained by ORing the beam detection signal and the interpolation signal.

2. The device according to claim 1, wherein the signal interpolating unit generates an interpolation signal obtained by shifting a period of the beam detection signal by a half period.

3. The device according to claim 1, wherein the control unit transfers the image data in synchronization with the image processing signal and performs beam scanning for the multibeam generating unit in synchronization with the beam detection signal.

4. The device according to claim 1, wherein the control unit counts delay lines in synchronization with the image processing signal and performs color matching processing for the multibeam generating unit.

5. The device according to claim 1, wherein the control unit performs zeronization processing for the image data in synchronization with the image processing signal.

6. The device according to claim 1, wherein the control unit changes an output mode for output to the multibeam generating unit according to a phase of the image data with respect to the beam detection signal.

7. The device according to claim 1, wherein the multibeam generating unit emits laser beams having a resolution of 1200 dpi simultaneously for four lines.

8. A multibeam image forming apparatus comprising:
    an image bearing member;
    a multibeam generating unit configured to simultaneously emit plural beams to the image bearing member;
    an optical system configured to scan the plural beams and focus the beams on the image bearing member; and
    a multibeam laser control device including, a control unit to preprocess image data in parallel using plural preprocessing units and output preprocessing data accumulated in a buffer to a multibeam generating unit, a signal interpolating unit to send out an interpolation signal which period is shifted from a beam detection signal sent out by detecting a beam of the multibeam generating unit and a signal processing unit to send out an image processing signal obtained by ORing the beam detection signal and the interpolation signal.

9. The apparatus according to claim 8, wherein the signal interpolating unit generates an interpolation signal obtained by shifting a period of the beam detection signal by a half period.

10. The apparatus according to claim 8, wherein the control unit transfers the image data in synchronization with the image processing signal and performs beam scanning for the multibeam generating unit in synchronization with the beam detection signal.

11. The apparatus according to claim 8, wherein
a plurality of the image bearing members are arranged in tandem, and
a plurality of the multibeam generating units and a plurality of the control units are arranged to correspond to the plurality of the image bearing members.

12. The apparatus according to claim 8, wherein the control unit counts delay lines in synchronization with the image processing signal and performs color matching processing for the multibeam generating unit.

13. The apparatus according to claim 8, wherein the control unit performs zeronization processing for the image data in synchronization with the image processing signal.

14. The apparatus according to claim 8, wherein the control unit changes an output mode for output to the multibeam generating unit according to a phase of the image data with respect to the beam detection signal.

15. The apparatus according to claim 8, wherein the multibeam generating unit emits laser beams having a resolution of 1200 dpi simultaneously for four lines.

16. A multibeam control method for an image forming apparatus comprising:
forming an image processing signal by ORing a beam detection signal and an interpolation signal which period is shifted a half period from the beam detection signal;
performing image processing in parallel with plural pre-processing units in synchronization with the image processing signal; and
performing beam scanning for the multibeam generating unit in synchronization with the beam detection signal.

17. The method according to claim 16, wherein the image processing is color matching processing for the image data.

18. The method according to claim 16, wherein the image processing is zeronization processing for the image data.

* * * * *